United States Patent

Gronholm

[11] 3,902,774
[45] Sept. 2, 1975

[54] FORCE EQUALIZING SYSTEM
[75] Inventor: Richard A. Gronholm, Monroeville, Pa.
[73] Assignee: Westinghouse Electric Corporation, Pittsburgh, Pa.
[22] Filed: Aug. 22, 1974
[21] Appl. No.: 499,672

[52] U.S. Cl. .................. 339/5 M; 310/68; 339/241; 357/79
[51] Int. Cl.² ......................................... H01R 39/32
[58] Field of Search .................. 310/68; 357/79, 76; 339/5 M, 5 R, 5 A, 241

[56] References Cited
UNITED STATES PATENTS
3,223,901  12/1965  Riley .................................... 357/76
3,721,843  3/1973  Spisak et al. ......................... 310/68

Primary Examiner—Granville Y. Custer, Jr.
Assistant Examiner—DeWalden W. Jones
Attorney, Agent, or Firm—G. H. Telfer

[57] ABSTRACT

Electrical conductor straps are arranged in opposing concave-convex pairs to connect pressure sensitive elements of a rotating device. The opposing concave-convex arrangement of the connecting conductor straps maintains the radial reaction forces acting upon the conductor strap portions within predetermined limits while substantially eliminating axial reaction forces which impose non-uniform loading upon the pressure sensitive elements.

4 Claims, 4 Drawing Figures

FORCE EQUALIZING SYSTEM

BACKGROUND OF THE INVENTION

1. Field of the Invention

This invention relates generally to brushless excitation systems for alternating current generators, and more particularly to improved conductor straps for connecting pressure contact diodes in a rotating rectifier assembly to each other or to other elements of such systems.

2. Description of the Prior Art

It is well known that electrical generating machines require direct current excitation. In alternating current generators the direct current excitation is supplied to a field winding which is carried on a rotor. This current may be supplied from an independent direct current source by means of carbon brushes bearing on slip rings, or by means of a "brushless" exciter system.

The brushless alternating current exciter, sometimes referred to as a "pilot" exciter, includes a stationary field structure and a rotating armature member. Direct current from an independent source is applied to the stationary field structure which creates a constant flux field from which alternating current is induced into the rotating armature member. A rotating rectifier assembly is carried on a common shaft with the exciter armature and is connected thereto to provide a direct current output. The output of the rectifier is supplied to the field winding of the main generator which also rotates with the exciter armature and rectifier. In this manner an excitation system is provided which requires no slip rings or brushes.

The rectifier assembly for such an excitation system requires a large number of components including semiconductor diodes, heat sinks, capacitors, resistors, fuses and the necessary connectors and supports. All these devices must be mounted in a manner which provides adequate support against the high rotational forces to which they are subjected in operation, and as compactly as possible to minimize the overall size and space required. This has been done heretofore by mounting the components of the rectifier circuit on the cylindrical inside surfaces of the rims of wheels carried on the rotor shaft in the manner shown in Hoover U.S. Pat. No. 3,371,235. This arrangement, which was intended for diodes of the stud-mounted type, has been entirely satisfactory in service.

More recently, however, semiconductor diodes of the disc type, or pressure contact type, have become available. As disclosed in Petersen et al. U.S. Pat. No. 3,521,132, diodes of this type are very suitable for rotating rectifier assemblies as they have relatively large current-carrying capacity and can be cooled on both sides because of their disc-shaped configuration, so that they have a greatly increased output for a given volume as compared to previously available diodes.

While the use of disc-type diodes is advantageous because of their increased current capacity, they introduce complex structural mounting problems in obtaining the proper contact pressure. Strong contact pressure must be maintained to minimize the diode-contact interface resistance, which is an inverse function of the contact pressure. Low resistance is desired in order to pass large currents while minimizing the heat generated by the large current flow. Furthermore, the contact pressures must be distributed evenly across the contact diode interface to assure uniform heat transfer. Non-uniform mechanical loading causes diode surface "hot-spots" which shorten the useful life of the diode.

A pressure contact diode mounting arrangement to which the present invention applies has been described in Spisak et al. U.S. Pat. No. 3,721,843 wherein the disc diodes and other necessary circuit components are assembled in rectifier modules. Each module has a base member which is preferably a metal container on which one or more diode assemblies are disposed. Each diode assembly consists of a disc-type diode compressed between two heat sinks, and spring means are provided for applying the necessary force to the diode assembly to maintain the desired contact pressure between the heat sinks and the diode when the exciter is not rotating. The necessary capacitors, fuses, voltage-dividing resistors and other components are also included within the module.

In the prior construction as described above, substantially straight copper conductors have been used to interconnect the diode assemblies with other modular elements. During normal operation these conductors are severely stressed by high centrifugal forces which cause breaking of the unsupported portions of the straight conductor. In order to keep the mechanical stresses in the unsupported portion of the conductor straps within predetermined material design limits, and provide needed flexibility, the strap was formed into a single curved member. However, the axial force reactions for this single-strap configuration are unbalanced at the ends of the curved portion of the conductor straps and therefore impose non-uniform loading upon the pressure sensitive diode assemblies and other elements to which the straps are connected.

As the capacity of these excitation systems increases, and the size of the conductor straps become larger to accommodate increased current flow, the centrifugal forces become greater and impose greater axial and radial reaction forces on the conductors and diode assemblies. The problem of keeping axial and radial reaction forces acting upon the conductor straps within predetermined material design limits while maintaining substantially uniform loading upon the modular elements to which they are connected thus becomes more difficult. The invention provided herein overcomes these objections to the prior art systems.

SUMMARY OF THE INVENTION

In accordance with the present invention, a conductor strap assembly is provided which is suitable for mechanical connection to pressure-sensitive components, such as the disc diode assembly contained within a rotating rectifier of the type discussed above. The conductor strap assembly, which is supported solely at its end portions by the elements to which it is attached, is composed and arranged so that the axial reaction forces which act upon its end portions are substantially cancelled, thereby eliminating axial loading of those elements to which it is connected. For this purpose, two electrical conductors having specified cross-section, length, and mass are formed into curved members and are arranged into an opposing concave-convex pair whose end portions are adapted for mechanical and electrical connection with modular elements, such as the pressure contact disc diode assembly and the fuse of the rotating rectifier described above.

During operation of the generator the conductor strap assembly is revolved about the center line of the main shaft. For a given operating speed and radius of rotation the strap assembly is subjected to a centrifugal force which is directly proportional to the mass of the strap assembly. Since the conductor strap is in translational equilibrium with respect to the elements to which it is attached, the centrifugal force is balanced by non-parallel, co-planar radial and axial reaction forces. Elementary vector analysis shows that the axial reaction forces which act upon the end portions of the individual conductor straps are greatly reduced by forming the conductor straps into arcuate members as compared to substantially straight members. Although the axial reaction forces are reduced by this single strap arrangement, they may be of sufficient magnitude to be unacceptable when applied to pressure sensitive elements which require uniform loading. Therefore, a second arcuate conductor strap is arranged with the first conductor strap to form a concave-convex opposed pair so that axial reaction forces on the two conductor straps cancel each other. The curved conductor straps are preferably identical but may have unequal arc length or radius of curvature to accommodate physical assembly constraints. However, the mass of each member is increased or decreased correspondingly to produce equal but opposite axial reaction forces at the union of the end portions of the conductor straps.

The advantage of the curved configuration lies in its ability to substantially reduce the magnitude of the reaction forces which maintain the structure in translational equilibrium. It may be shown that the magnitude of the reaction force $F_R$ at the end point of a curved structure which is stressed by an applied force $F_A$ is described by the following relation:

$$\left| F_R \right| \leq \frac{1}{2} \cdot \frac{\left| F_A \right|}{\sin \theta}$$

where $\theta$ is the angle of inclination of the structure at the point in question. Thus, the magnitude of the reaction force $F_R$ approaches one-half of the magnitude of the applied force $F_A$ in the limit $$\theta = \frac{\pi}{2}.$$

An optimum curve for the arcuate portion may be selected based on a desired level of stress for predetermined speed conditions, and the resultant stress acting upon the rotating conductor strap will be maintained within material design limits. If the arcuately formed conductor portion is arranged in a convex relationship with respect to the axis of rotation, the conductor ends will tend to pull together and the axial components of the reaction forces will be directed inwardly toward the center of the conductor. These axial reaction forces are cancelled by arranging a second arcuately formed conductor strap in a concave relationship with respect to the axis of rotation so that an opposing concave-convex conductor pair is formed. The ends of the concave member tend to push apart during rotation thereby creating an axial reaction force which is directed outwardly away from the center of the conductor. The mass of each conductor strap is adjusted so that equal but opposite axial reaction forces are produced. Thus, a conductor strap assembly is provided which will withstand centrifugally induced stresses and which will not impose axial loading upon the elements to which it is connected.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
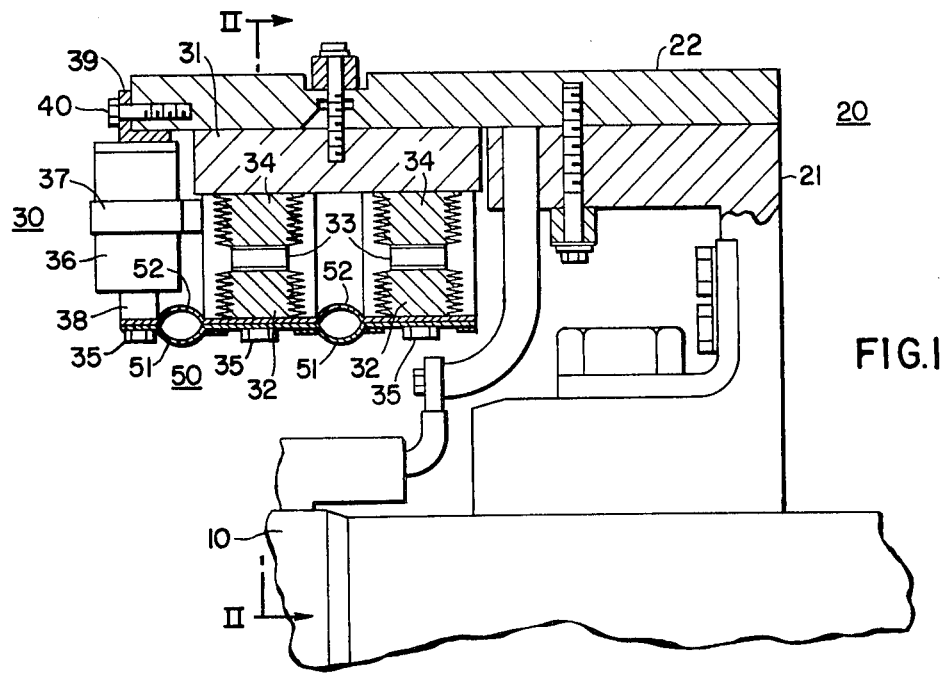
FIG. 1 is a partial elevational view, in section, of a rectifier module illustrating a preferred embodiment of the invention.

Throughout the description which follows, like reference characters refer to like elements on all figures of the drawing.

Figure 2:
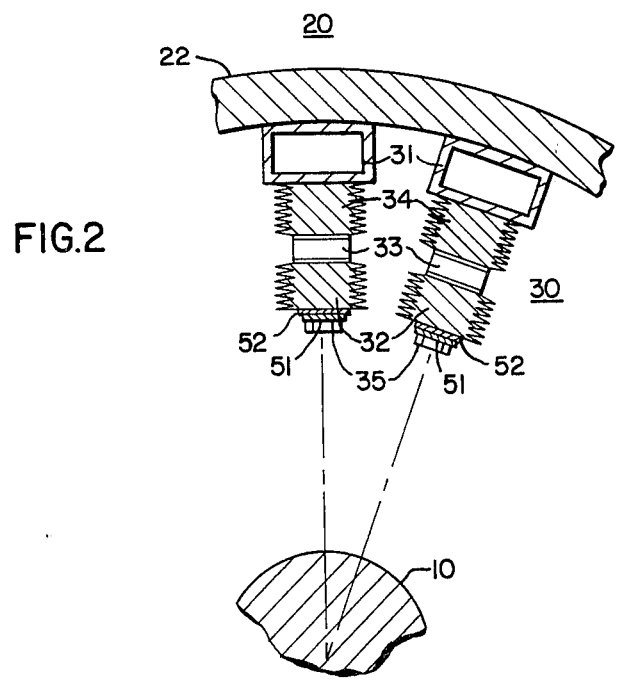
FIG. 2 is a partial transverse view substantially on the line II—II of FIG. 1.

As previously indicated, the present invention is incorporated within a modular rectifier assembly, a plurality of modules being used to make up the complete rotating rectifier. A rectifier module 30 of the preferred construction is shown in FIG. 1 and FIG. 2.

An armature member (not shown) is also mounted on the shaft 10 and is rotated as the shaft 10 rotates. A rectifier wheel 20 shown in FIG. 1 is mounted for rotation upon the shaft 10.

Attached to the rectifier wheel 20 is a plurality of rectifier modules 30. Each rectifier module 30 includes a conducting base member 31 which is preferably in the form of a hollow container, such as rectangular box as shown in the drawings, and is preferably made of aluminum or other conductive material of suitable strength. A capacitor assembly (not shown) may be potted within the conducting base member 31.

One or more diode assemblies are disposed on each base member 31. In the preferred embodiment shown in the drawings, two such assemblies are provided. Each assembly consists of a rectifier diode 33 of the disc, or pressure contact type, and two heat sinks 32 and 34. The heat sinks may each be a block of aluminum or copper, or other suitable electrically and thermally conducting material capable of acting as a heat sink, preferably having peripheral fins as shown to increase the radiating surface and heat dissipating ability. The mass of the heat sinks is made such that at the normal operating speed of the rotating rectifier assembly, the force applied to a diode 33 is sufficient to provide the required electrical contact pressure and current carrying ability but is not great enough to exceed the minimum force which would cause mechanical damage to the diode. The upper heat sink 34 directly engages the conductive base member 31, and the diode 33 is in electrical contact with the heat sinks 32 and 34.

A fuse 36 may also be provided as part of each rectifier module. The fuse 36 may be any suitable type of fuse capable of operation at high rotational speed and it is attached to the base member 31 by means of a clasp 37. The fuse 36 has an upper terminal 39 which is adapted to be connected to the rectifier wheel 20 and for that purpose is drilled to receive a bolt 40 which is preferably captivated in a rim portion 22 of the rectifier wheel 20.

The elements of the rectifier module 30 are electrically connected together by means of a copper strap connector 50 which extends across the assembly. The connector 50 is generally arcuately formed between modular elements with an arcuate portion 52 disposed in a convex relationship with respect to the center line of rotation. A second arcuate portion 51 is disposed in a concave relationship with respect to the center line of rotation and forms an opposed convex-concave conductor pair which connects the pressure diode heat sink assembly with the lower terminal 38 of fuse 36.

Figure 3:
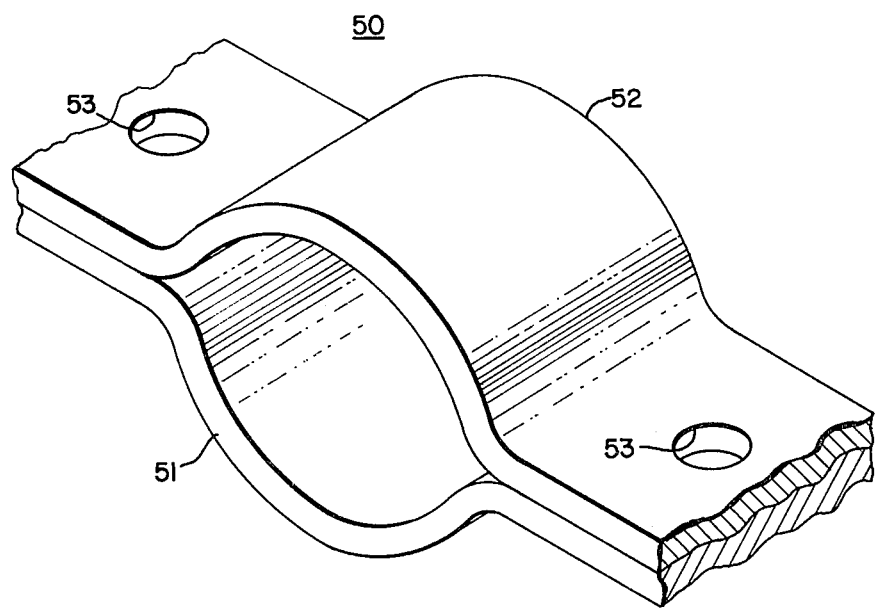
FIG. 3 is an isometric view of a concave-convex opposed conductor pair.
Figure 4:
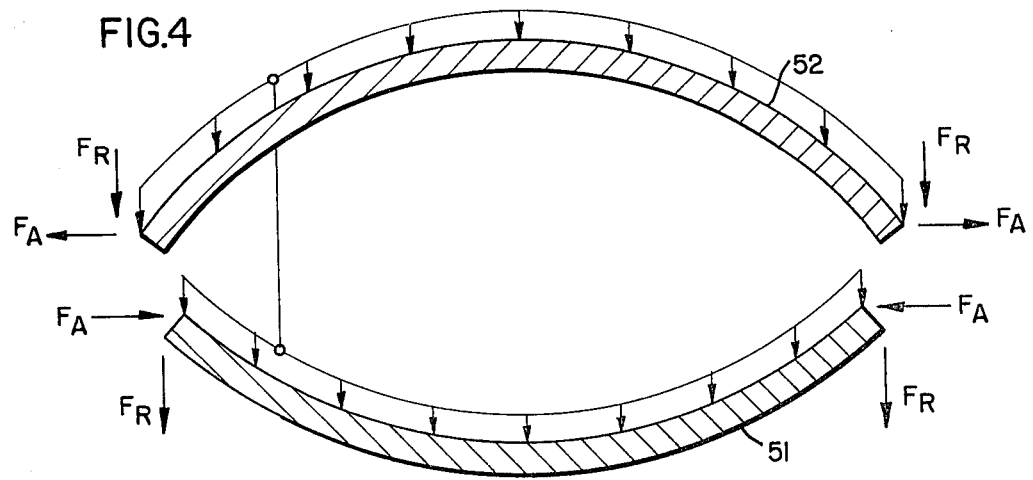
FIG. 4 is an elevational view, in section, of a concave-convex opposed conductor pair in which axial and radial loading is illustrated.

Referring now to FIGS. 1 and 3, the opposing concave-convex connector assembly maintains the radial and axial reaction forces acting upon the unsupported conductor strap portions 51, 52 within predetermined material design limits while substantially eliminating axial reaction forces which impose non-uniform loading upon the diode 33. The end portions of connectors 51, 52 lie flush against the face of heat sink 32 and lower terminal 38 of fuse 36. Both end portions have circular openings 53 adapted to receive a bolt 35 which extends through the openings and holds the end portions of connector 50 in electrical and mechanical connection to the modular elements.

Although only one module 30 has been illustrated in the drawings it should be understood that like modules are symmetrically disposed around the entire inside periphery of the diode wheel 20.

I claim:

1. A device for mechanically connecting two or more spaced elements one to the other, said spaced elements being affixed to a wheel for rotation about an axis, said device comprising a resilient member having a plurality of end portions adapted to join said spaced elements, said resilient member further comprising an opposed pair of arcuately shaped half sections, said first half section being disposed in a concave relationship with respect to said second half section, said first and said second half sections having predetermined cross-section, length, mass, and radius of curvature.

2. The device of claim 1 wherein an axial reaction force exerted by the mass of said first half section is opposed by an axial reaction force exerted by the mass of said second half section.

3. The device of claim 1 wherein said resilient member is a conductor of electrical current.

4. The device defined in claim 3, the end portions of said resilient member being electrically connected to a disc-type diode and a fuse, said diode and fuse being spaced apart and secured to a rectifier wheel of a rotating rectifier assembly in a brushless excitation system.

* * * * *